United States Patent
Johnston et al.

[15] 3,677,627
[45] July 18, 1972

[54] FILM SPROCKET HOLE SENSING

[72] Inventors: Robert F. Johnston, Wildwood; Wieslaw Lichodziejewski, Mount Prospect, both of Ill.

[73] Assignee: Bell & Howell Company, Chicago, Ill.

[22] Filed: Feb. 17, 1971

[21] Appl. No.: 116,053

[52] U.S. Cl..........................352/109, 250/219 DR, 352/38, 352/92
[51] Int. Cl. ................................................G03b 41/10
[58] Field of Search.....................352/109, 105, 110, 92, 38; 250/219 DR

[56] References Cited

UNITED STATES PATENTS

| | | | |
|---|---|---|---|
| 2,843,006 | 7/1958 | Tyler | 352/109 |
| 3,067,284 | 12/1962 | Baldwin | 352/109 X |
| 3,459,471 | 8/1969 | Jonnston | 352/105 |

Primary Examiner—Samuel S. Matthews
Assistant Examiner—Robert P. Greiner
Attorney—Luc P. Benoit

[57] ABSTRACT

Film sprocket hole sensing methods project borderline images along with sprocket hole images from film with transparent film margins. The borderline images are darker than the sprocket hole images and adjacent luminous areas arising from the penetration of light through the transparent film margin. Movement of the luminous sprocket holes is sensed by sensing movement of the borderline images with light-sensitive sensing devices.

15 Claims, 12 Drawing Figures

Patented July 18, 1972

FILM SPROCKET HOLE SENSING

CROSS-REFERENCE TO RELATED APPLICATIONS

Subject matter disclosed in the present patent application is disclosed and claimed in either of the following patent applications which are assigned to the subject assignee and are herewith incorporated by reference herein:

U.S. Pat. Application Ser. No. 89,323, filed Nov. 13, 1970, by Joseph H. Lancor, Jr., and Leonard A. Ferrari; and U.S. Pat. Application Ser. No. 105,515, filed Jan. 11, 1971, by James G. Woodier.

BACKGROUND OF THE INVENTION

1. Field of the Invention

The subject invention relates to optics and, more particularly, to the display of images or other information from film.

2. Description of the Prior Art

While the prior art and the subject invention are primarily described with reference to non-intermittent or continuous image display, it should be understood that no limitation of the utility or applicability of the subject invention to that field is intended.

There exist many proposals for projecting motion pictures or other information from a continuously moving film with the aid of an optical compensator that tracks successive portions of the film. In many of these proposals, film sprocket holes are employed as fiducial markings for controlling proper synchronism between the optical compensator and the film. For instance, sprocket hole images are projected by way of the compensator as a reference for sensing movements of the supposedly stationary projected image. These sensed movements are thereafter employed to control the supply of power to the compensator so as to establish the desired tracking of the moving film. Similarly, sprocket hole images are employed to control the resetting of the compensator between subsequent tracking operations.

With past sprocket hole sensing methods, best results were obtained when the sprocket holes were located in an opaque or black film margin. In that case, the contrast between the sprocket hole apertures and the film margin was very high. However, methods relying on that high contrast were inoperative with the great bulk of motion picture film, since practically all commercially produced films and most amateur films produced in a printing process have transparent film margins.

An exploitation of the relatively small difference in light transmissibility between sprocket holes and transparent film stock has been tried but has not been generally successful.

Further proposals in this area operate with light that is reflected from the transparent film margin. A dark background is provided behind the margin so that no light is reflected at sprocket hole locations. Operation with reflected light leads to a generally low efficiency of the sensing process. Also, space problems at critical areas are encountered because of the necessity of a light source ahead of the film margin.

A further proposal attempts to sense sprocket holes in a transparent film margin by projecting a beam of light at an oblique angle through the margin. This beam is laterally deflected by the thin material between sprocket holes, but is capable of penetrating sprocket holes without lateral deflection. Accordingly, by sensing whether a lateral beam deflection is present or not it is at least theoretically possible to determine the occurrence of sprocket holes. In practice, this method is too delicate as to be of general use. Also, problems are encountered from the fact that the light beam has to impinge upon and emerge from the film margin at a relatively sharp angle.

SUMMARY OF THE INVENTION

The subject invention avoids the above mentioned disadvantages and, from one aspect thereof, resides in a method of sensing movement of a luminous sprocket hole image projected from a sprocket hole in a transparent film margin.

According to that method of the subject invention, a borderline image located at the sprocket hole image and a luminous area including light having penetrated the transparent film margin adjacent the sprocket hole are projected along with the sprocket hole image. The borderline image is darker than the luminous sprocket hole image and the latter luminous area. Movement of the luminous sprocket hole image is sensed by sensing movement of the projected borderline image with light-sensitive sensing means.

The sprocket hole image, the borderline image and the above mentioned luminous area are preferably produced by transmitting light through the sprocket hole and adjacent transparent film margin and projecting such transmitted light.

Upon projection, the dark borderline image is easily noticed at the projected sprocket hole image and inside of the above mentioned luminous area. While we do not wish to subscribe to any particular theory, it is our present opinion that the occurrence of the observed borderline image is due to diffraction or refraction, or to a combination of these phenomena. For instance, it appears that light proceeding through the film sprocket hole experiences a diffraction of the sprocket hole edges, resulting in a diffraction pattern including the borderline requisite to the operation of the subject invention. Alternatively or additionally, light which angularly enters the sprocket hole is reflected at an inside wall of the sprocket hole in a direction away from that sprocket hole. Furthermore, light which angularly enters the transparent film margin adjacent the sprocket hole in a direction toward the sprocket hole is deflected at a refractive angle towards the sprocket hole. That deflected light is thereupon reflected by the film-to-air interface at the sprocket hole. As a result, the light under consideration leaves the transparent film at an angle which carries it beyond the pull-in range of the projection lens. Similarly, light which angularly enters the transparent film margin adjacent the sprocket hole in a direction away from the sprocket hole is deflected further away from the sprocket hole thereby providing for a dearth of transmitted light at sprocket hole edges.

Moreover, if the film is not exactly perpendicular to the optical axis of the projection lens, then an image of the film thickness at the sprocket hole will be projected along with the sprocket hole image, further emphasizing the observed dark borderline. It will thus be appreciated that the dark borderline image may be due to any one or more of the above mentioned optical effects.

The expression "borderline image" herein employed refers to a dark line which extends along at least one edge of the sprocket hole image. In practice, this borderline image may extend along two or more edges of the sprocket hole image. Since the expression "borderline" is broad enough to cover also a dark outline around the entire sprocket hole image, the somewhat more qualified expression "borderline element image" is herein employed to refer to a borderline portion that extends along a sprocket hole edge, and that may or may not be part of a borderline.

In accordance with a preferred embodiment of the subject invention, there is projected along with the sprocket hole image a first borderline element image located at one side of the sprocket hole image, and a second borderline element image located at an opposite side of the sprocket hole image. Moreover, luminous areas located adjacent the borderline element images and including light having penetrated the transparent film margin adjacent the sprocket hole, are also projected along with the sprocket hole image. As before, the borderline element images are darker than the luminous sprocket hole image and the latter luminous areas.

Movement of the luminous sprocket hole image is sensed by sensing movements of the first borderline element image with first light-sensitive sensing means, and sensing movements of the second borderline element image with second light-sensitive sensing means.

The methods so far described have utility of themselves, since the data obtained from sensing the sprocket hole image movements may be utilized for various purposes.

Methods according to the subject invention in which the above mentioned concepts are employed for tracking information areas on a continuously moving film will be disclosed as this description proceeds.

BRIEF DESCRIPTION OF THE DRAWINGS

The subject invention will become more readily apparent from the following detailed description of preferred embodiments thereof, illustrated by way of example in the accompanying drawings, in which.

DESCRIPTION OF PREFERRED EMBODIMENTS

By way of example, and not by way of limitation, the preferred embodiments are herein disclosed and illustrated with reference to the above mentioned copending patent application by Joseph H. Lancor, Jr., and Leonard A. Ferrari, which is herewith incorporated by reference herein:

The non-intermittent or continuous motion picture projector 10 shown in FIGS 1, 2, 3 and 4 has a film gate 12 which may be curved in accordance with well-known principles rendering the angular rate of film advance equal for different points of the film gate.

Figures 1, 2:
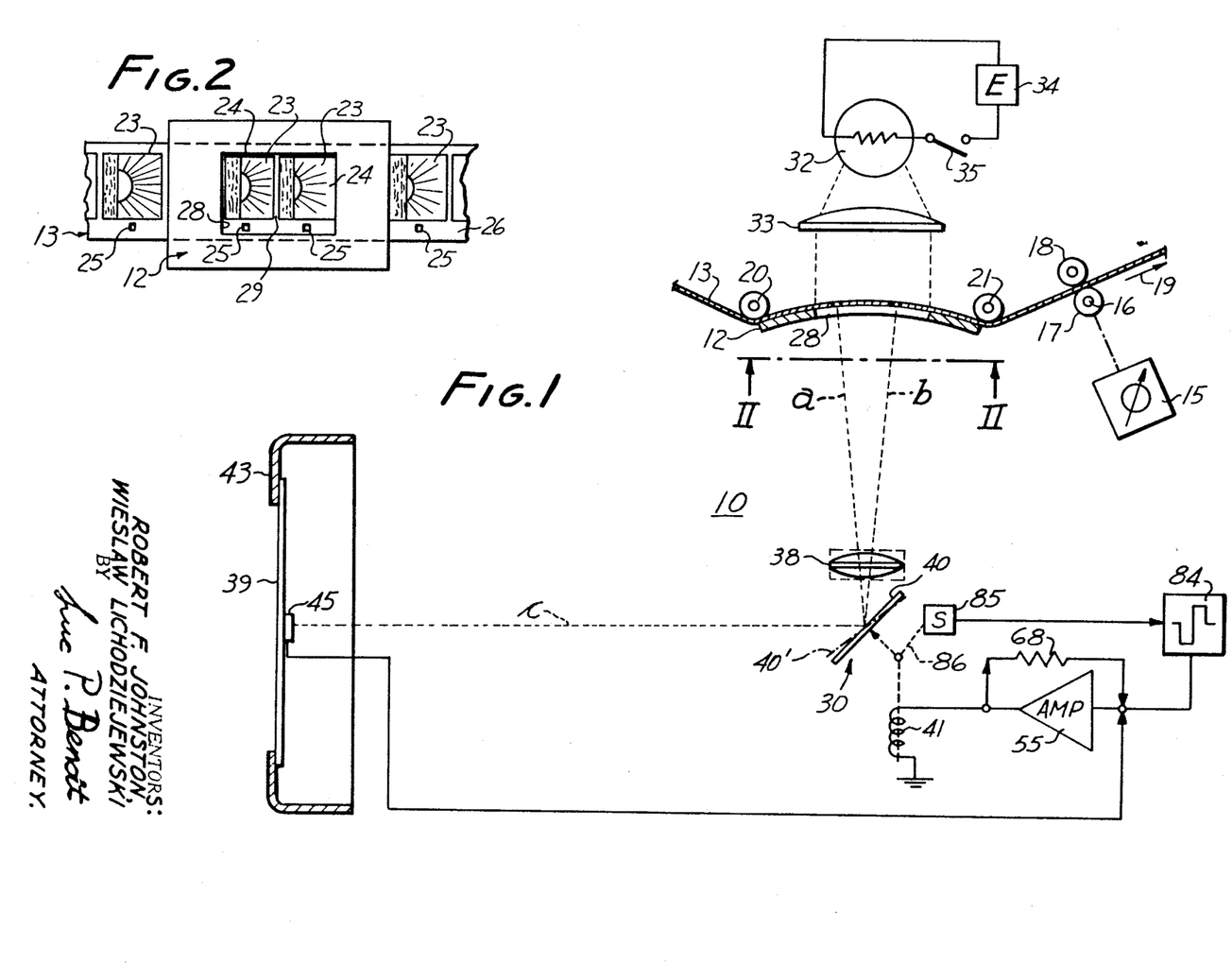
FIG. 1 is a diagrammatic illustration of a non-intermittent or continuous motion picture projector implementing a preferred embodiment of the subject invention.
FIG. 2 is a view substantially along lines II—II of FIG. 1.

A conventional variable speed drive 15 has a capstan 16 which may have a rubber lining 17 that engages the film with the aid of a nip roller 18. The drive 15, which may comprise a variable-speed electric motor with reduction gear (not shown), is set at any practical speed to advance a motion picture film 13 through the film gate 12 in the direction of an arrow 19 at a substantially continuous or uniform rate (as distinguished from an intermittent film advance). Two guide rollers 20 and 21 assist the movement of the film into and out of the film gate.

In principle, a sprocket drive can be used for advancing the film 13. Where film sprocket holes are employed as control marks, it is, however, preferred that a capstan which does not wear out the sprocket hole areas be used as the power-transmitting device.

The film 13 bears a succession of optically reproducible recordings in the form of transparent images 23 located in image frames 24 and typically representing a filmed scene. The film further has sprocket holes 25 along a margin 26 thereof. In accordance with known principles, the film gate has a projection aperture 28 whose length is at least equal to twice the height of each image from 24 plus the height of an interframe space 29, so that the continuous motion compensator 30 is able to handle two full image frames in succession. The width of the projection aperture is sufficient for a projection of the sprocket hole that pertains to each projected image.

The film 13 at the projection gate 28 is illuminated by a projector lamp 32 and condensor lens system 33. The lamp 32, which may have a conventional reflector (not shown), is energized from an electric power source 34 upon closure of a switch 35. A projector lens system 38 projects the illuminated images and sprocket holes by way of the continuous motion compensator 30 onto a conventional back-lighted screen 39. The back-lighted screen is shown by way of example, and a conventional front-lighted screen may be used instead.

The compensator 30 has a first-surface mirror 40 which is repeatedly advanceable by motive power applied to a coil 41 through a range of angular motion so as to compensate for the continuous movement of the film 13. The objective of the compensator mirror 40 is to maintain each projected image substantially stationary. Since the projection aperture 28 in the film gate 12 is larger than an image, the screen 39 is provided with an opaque frame 43 which blocks from the view of the observer the projected sprocket holes and also part of images other than the one image that is being projected for viewing at the particular time.

A device 45 is located at the screen for sensing relative movements of each displayed image in a first direction corresponding to the direction 19 of movement of the film 13. The device 45 also senses relative movement of displayed images in a second direction opposite the first direction just mentioned. These movements in a second direction occur, for instance, if the compensator mirror 40 overshoots in its forward motion the advance of the film.

Figures 3A, 3B, 3C, 4, 5, 6:
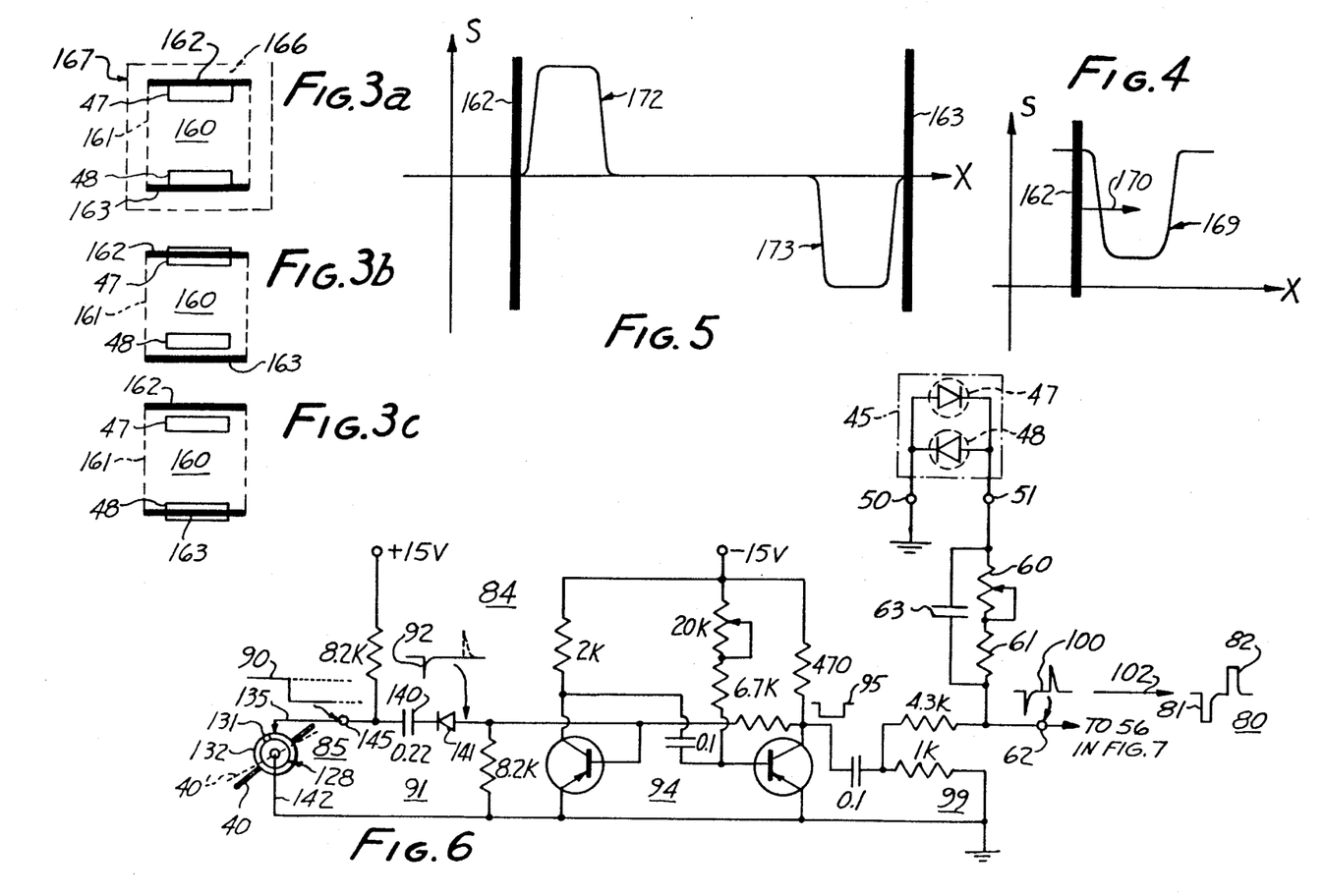
FIGS. 3a to 3c are diagrammatic illustrations of different phases of operation of the projector according to FIGS. 1 and 2.
FIG. 4 is a signal-versus-displacement plot for explaining a detail of the operation of the projector of FIG. 1.
FIG. 5 is a signal-versus-displacement plot which further illustrates the operation of the projector of FIG. 1.
FIG. 6 is a circuit diagram of a resetting pulse generator and image motion sensor of the projector of FIG. 1.

By way of example and as shown in FIG. 6, the motion sensing device 45 may include two conventional photovoltaic cells 47 and 48 located near each other. The luminous sprocket hole is projected by way of the compensator mirror 40 onto the light-sensitive parts of the photocells 47 and 48. Each of the photocells 47 and 48 produces a signal which varies as a function of the area of cell illumination. Since the cells 47 and 48 are connected in parallel and at opposite output signal polarities between two terminals 50 and 51 of the sensing device 45, the two output signals of the cells 47 and 48 buck each other, producing a zero net signal across the terminals 50 and 51 when the photocells 47 and 48 receive equal portions of a projected sprocket hole 53. In response to projected luminous sprocket holes, the cells 47 and 48 produce a zero net signal in response to equal illumination by portions of the projected sprocket hole.

It may be helpful to note at this juncture that the sensor 45 need not necessarily be located at the screen 39. Rather, the sensor 45 may be positioned closer to the compensator mirror 40 (such as within the projector housing), with a lens (not shown) being provided for imaging the illuminated sprocket hole onto the sensing device 45 after projection thereof by way of mirror 40.

The projected luminous sprocket hole images are shown in FIGS. 3a–3c at 160 within an outline 161. A first borderline element image 162 appears at one side of the sprocket hole image 160 due to any one or more of the above mentioned diffraction, refraction, reflection or projection effects. Similarly, a second borderline element image 163 appears at the opposite side of the sprocket hole image. Some of the light which penetrates the transparent film margin 26 adjacent the particular sprocket hole provides luminous areas 166 adjacent the borderline element images. In FIG. 3a, these luminous areas are shown consolidated into a halo 167. To avoid crowding, the luminous areas 166 have not been shown again in FIGS. 3b and 3c. It is however, to be noted that the borderline element images are darker than both the sprocket hole image 160 and the adjacent luminous area 166.

As also shown in FIGS. 3a to 3c, the photocells 47 and 48 are long and narrow; extending with their long axes parallel to the borderline elements 162 and 163. For maximum sensitivity, the long axes of the light-sensitive areas of the photocells 47 and 48 may be substantially equal to the lengths of the borderline element images 162 and 163. It is, however, preferable in practice that the long axes of the photocells be somewhat shorter than the lengths of the borderline element image to avoid normal tolerances of the sprocket hole image sizes and positions from taking effect.

The short axes of the light-sensitive areas of the photocells 47 and 48 should be larger than the widths of the borderline element images 162 and 163 to avoid disturbances from dirt particles and normal irregularities in the sprocket hole edges. By way of example, the short axis of each photocell may be about four to five times the width of the corresponding borderline element image.

Photocells of the type shown at 47 and 48 are commercially available. Examples include the Hoffman silicon photocell type 58C and the type SS–12–LC photocell manufactured by the Solar Systems Division of Tyco Corporation.

The curve 169 of GIG. 4 shows the magnitude of the output signals $s$ of, say, the photocell 47 as a function of the displacement $x$ of the borderline element image 162. The sprocket hole image 160 reaches the photocell 47 unobstructed when the borderline element image 162 is adjacent to the upper edge of that photocell. Accordingly, the photocell 47 then provides a high-level output. When the borderline element image 162 moves onto the photocell 47 (see the arrow 170 in FIG. 4), the output of this photocell drops to a low level. Further displacement of the borderline element image 162 would lead to a resumption of the high-level photocell output.

It will thus be recognized that the use of a single photocell and borderline element image has utility of itself, since the photocell provides a useful signal indicating movement of the sprocket hole image. In the preferred embodiment of FIGS. 3a to c, however, there is the photocell 47 for sensing movement of the borderline element image 162, and the photocell 48 for sensing movement of the borderline element image 163. More specifically, the photocell 47 senses movement of the borderline element image 162 in a first direction, and the photocell 48 senses movement of the borderline element image 163 in a second direction opposed to the first direction.

In principle, this directional sensing may be accomplished by photocells which are located outside of the normally positioned borderline element images, or by photocells which are located inside these borderline element images. In other words, the photocells may be spaced from each other by an overall distance smaller than the distance between the borderline element images, or by a distance larger than the distance between outsides of the borderline element images. Both solutions are workable with transparent film margins and are intended to be covered herein.

The solution illustrated in FIGS. 3a to c, is however, greatly preferred by us for reasons presently to be mentioned. If the distance between the photocells 47 and 48 is smaller than the distance between the borderline element images 162 and 163, with the outer edge of the photocell 47 being adjacent the inner edge of the borderline element image 162, and the outer edge of the photocell 48 adjacent the inner edge of the borderline element image 163, then the sensor is capable of handling both transparent-margin and opaque-margin film. Moreover, the sensor is then not affected by non-uniformities in the light-transmissibility of the film base. Rather, the operation of the sensor, with the photocells in the last-mentioned locations, benefits from the deliberately uniform light level at the projection aperture 28.

With either type of film, the photocells 47 and 48 are hit by the luminous sprocket hole image 160. In the case of transparent-margin film, the cells sense movements of the borderline element images 162 and 163 located adjacent the sprocket hole image 160 and within the luminous areas 166. In the case of opaque film, the halo 167 with luminous areas 166 and the borderline element images 162 and 163 are replaced by a dark border around the sprocket hole image 160. In consequence, the cells then sense movement of that dark border.

The versatility of the projector according to FIG. 1 is, of course, greatly increased if it can handle both transparent-margin film and opaque margin film, inasmuch as film developed by a reversal process typically has an opaque border, while film printed from a negative typically has a transparent border.

The graph of FIG. 5 illustrates the magnitude of the combined output signal $s$ of the bucking photocells 47 and 48 (see FIG. 6) as a function of the displacement $x$ of the borderline element images 162 and 163. The combined photocells 47 and 48, when perfectly balanced, produce no net signal as long as the borderline element images 162 and 163 remain outside of these photocells (see FIG. 3a). Movement of the borderline element images 162 onto the photocell 47 switches that photocell to a low-level output. Accordingly, the high-level output of the photocell 48 then dominates the sensor output. The resulting combined signal level is shown by the curve 172 in FIG. 5.

Conversely, movement of the borderline element image 163 onto the photocell 48 switches that photocell to a low-level output, so that the high-level output of the photocell 47 then dominates at the sensor output, as illustrated by the curve 173 in FIG. 5. Accordingly, movements of the sprocket hole image 160 in opposite directions are indicated by the sensor 45 by electric signals of correspondingly opposite polarities. These signals drive a servo amplifier 55 for energizing the compensator coil 41 that moves the mirror 40. In the system shown in the drawings, no routine sawtooth motion is imposed on the compensator mirror 40. Rather, the mirror is only advanced in accordance with the then prevailing demands of the system aiming at a stabilization of displayed images in a substantially stationary condition.

To illustrate this principle, a dotted line $a$ in FIG. 1 approximately designates a ray of light emanating from the center of an image 23 initially appearing in the aperture 28 of the film gate 12 for projection by the objective 38 and via the compensator mirror 40 onto the screen 39. A dotted line $b$, on the other hand, approximately designates a ray of light emanating from the center of the same image, after that image has traveled along the film gate 12 to its extreme position in the aperture 28, just before the compensator mirror 40 is reset onto the next succeeding image. The stop plane of the lens 38 is preferably in front of the lens near the mirror 40.

The letter $c$ in FIG. 1 designates a ray of light leading from the compensator mirror 40 to the center of the projected image on the screen 39. To maintain each projected image stationary during the movement of the image center lines from $a$ to $b$, the mirror has to advance during such movement by an angle of a magnitude substantially equal to one-half of the magnitude of the angle between the lines $a$ and $b$.

To provide for such a mirror advance, the mirror 40 is wide enough to receive and project images of the sprocket holes 25 which are illuminated by the projector lamp 32. Where the mirror 40 operates in substantially collimated light, as is preferably the case, reduction of the mirror size reduces the total light level, but does not as such suppress passage of the sprocket hole image. As indicated above, borderline element images and adjacent luminous areas are projected to the sensing device 45 along with the sprocket hole images (see FIGS. 3a to c and accompanying text). The relationship between the photocells 47 and 48 and the projected elements 160, 162, 163 and 166 is as shown in FIG. 3a when the mirror 40 tracks the film 13 perfectly (assuming no offset is introduced by the servo system).

If the mirror advance lags the film, the sprocket hole image 160 moves downwardly as seen in FIG. 3b, placing the borderline 162 onto the photocell 47, as shown in FIG. 3b. This provides an error signal of a first polarity. If the mirror advance leads the film, the borderline 163 moves onto the photocell 48 as shown in FIG. 3c, providing an error signal of the opposite polarity.

These error signals are applied to the servo amplifier 55 which drives the compensator mirror corresponding.

As has been disclosed in the above mentioned Lancor and Ferrari patent application, a substantially constant tracking error may be realized between the angular advance of the mirror 40 and the continuously moving film 13. This tracking error is preferably realized by frictional and other damping of the driven compensator part including the mirror 40. Bias or suspension springs at the driven compensator part are preferably avoided. Nevertheless, the practice of the subject invention is not limited to systems without spring bias at the compensator.

The photocells 47 and 48 translate the above mentioned tracking error into a corresponding error signal which acts on the servo amplifier 55. That amplifier, in turn, produces a corresponding drive current for the compensator coil 40 which develops an advance torque for the mirror in accordance with the mirror tracking error. In this manner, the projected image is displayed in a substantially steady manner, without undue jitter.

As has been further disclosed in the above mentioned Lancor and Ferrari patent application, and as will be more fully mentioned below, a direct-current level may be applied to the servo amplifier 55 in lieu of or in addition to the drive current provided by the tracking error, in order to provide for a biasing of the mirror 40 in a direction opposite to the direction of mirror advance during the display of each image. This further helps eliminate the need for the traditional bias spring at the mirror 40 or at least permitting the use of only a weak mirror suspension or bias spring. If no mirror bias spring is used, the amplifier 55 does not have to provide a mirror drive current that increases in a sawtooth fashion to overcome the force of a mirror bias spring as the display of the image progresses. Similarly, if a spring of low spring constant is used for mirror suspension or other purposes, the servo amplifier 55 still does not have to provide a mirror drive current that rises to as high a magnitude as would be required if the spring had a sufficiently high spring constant to effect an automatic resetting of the mirror 40 between image displays or to act as the sole agency for precluding overshooting of the mirror 40 during image display.

In addition, the amplifier 55 is constructed to develop and apply to the mirror drive coil 41 a decelerating current when a large excursion of the error signal developed by the sensing device 45 indicates the danger of ringing of the servo system. These features are more fully disclosed in the above mentioned copending Lancor and Ferrari patent application. Also, it should be understood that systems which generate sawtooth currents for driving the compensator mirror 40 may, if desired, be employed, since the practice of the subject invention is not limited to the illustrated projector system.

Figure 7:
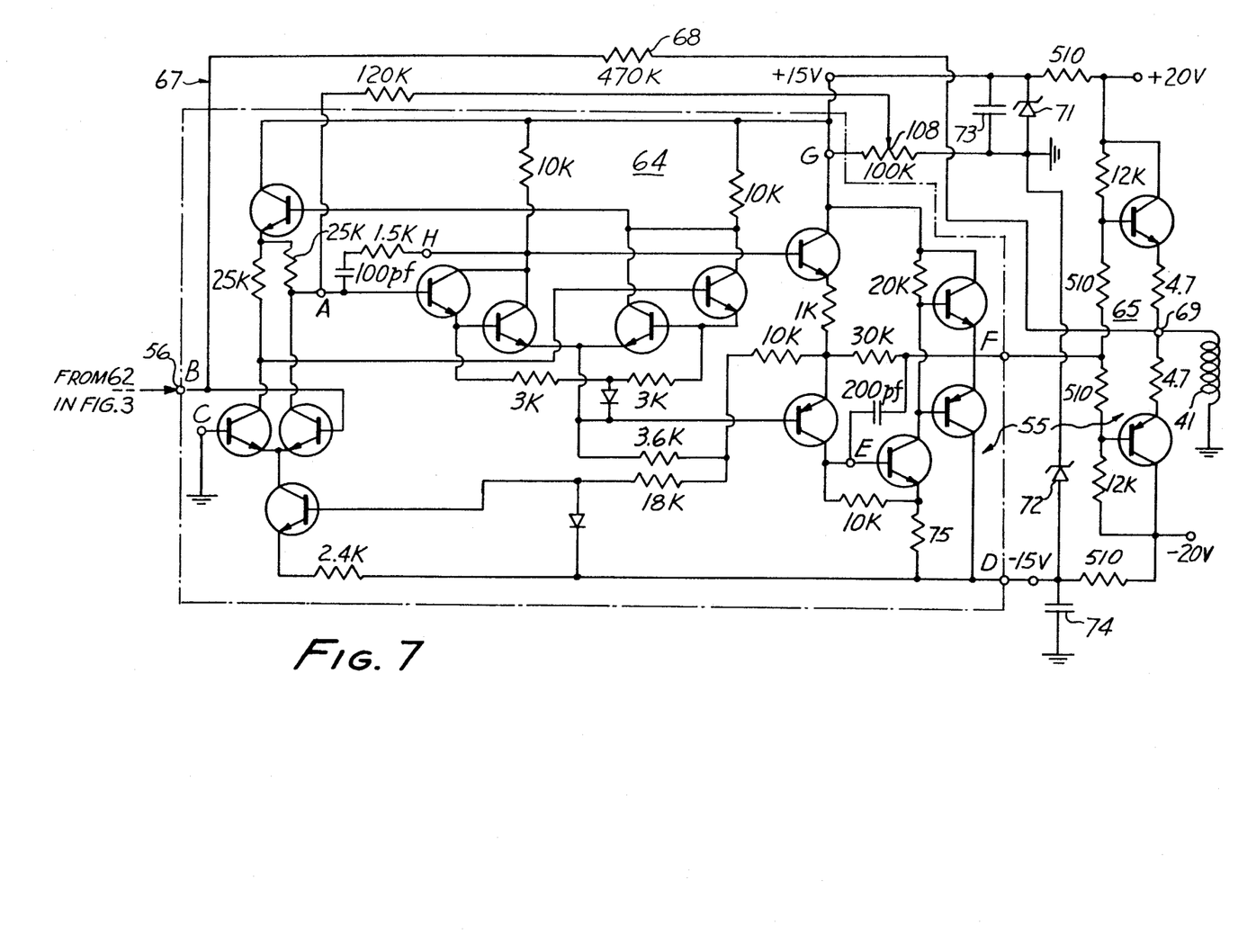
FIG. 7 is a circuit diagram of a servo amplifier and mirror drive of the projector of FIG. 1.

The preferred circuit diagrams of FIGS. 6 and 7 will now be considered.

According to FIGS. 6 and 7, the motion sensing device 45 may be connected to the amplifier input terminal 56 through resistors 60 and 61 and a terminal 62. The resistor 60 is adjustable to render the loop gain variable. A capacitor 63 is connected in parallel to the resistors 60 and 61. The combination of resistors 60 and 61 and capacitor 63 provides an electric damping network.

A preferred amplifier 55 is illustrated in FIG. 4 and comprises an operational amplifier 64 and a complementary emitter follower output stage 65. Those skilled in the art of integrated circuits will recognize that the operational amplifier 64 is available in monolithic form from several manufacturers as standardized circuit 1709 (for instance Motorola OPAMP MC1709C). Accordingly, a detailed elaboration on the circuit diagram of opamp 64 beyond its illustration in FIG. 7 is unnecessary.

The output stage 65 of the amplifier 55 is a conventional complementary emitter follower stage that also does not require any special elaboration as to its circuitry. The feedback path 67 for the amplifier 55, with a feedback resistor 68, is connected between the amplifier output 69 and the amplifier input 56. The compensator coil 41 is connected to the amplifier output 69. The supply voltage stabilizer with Zener diodes 71 and 72 and filter capacitors 73 and 74 is also conventional.

The requisite direct-current level for biasing the mirror 40 in a direction opposite to the direction of mirror advance during image display is provided by developing a direct current potential with the aid of a potentiometer 108. This potentiometer is connected between the +15 volt terminal of the current supply and ground. The slidable contact of the potentiometer 108 is connected to a further input A of the servo amplifier 55 or operational amplifier 64. In this manner, an adjustable current is provided in the drive coil 41 for biasing the compensator mirror 40 in a direction opposite to or against the direction of mirror advance during image display.

During image display, undesired image movements are easily reduced by increasing the gain of the amplifier 55. This gain is preferably higher than 100 and may be in the thousands.

Upon completion of the display of an image, the compensator mirror 40 is angularly reset preparatory to the display of the next image. As disclosed in the above mentioned copending Lancor and Ferrari patent application, timed electric pulse doublets are applied to the compensator coil 41 for resetting the mirror 40 between image displays. If the polarity of the mirror advance driving power is considered positive, then the resetting doublet 80 illustrated in FIG. 6 comprises a negative pulse 81 followed by a positive pulse 82. The negative pulse 81 angularly drives the mirror 40 backwards at high speed, and the succeeding positive pulse 82 of the doublet prevents an over-shooting of the mirror 40 in the reverse direction. This does away with the necessity of a mechanical stop or motion arresting device which has proved its demerits in prior art systems as a fertile source of wear and tear, noise, jitter and other trouble.

According to the above mentioned Woodier patent application, resetting of the compensator is effected in response to the provision of an electric signal by a signal generating device 85. The signal generating device 85 is coupled to the compensator drive 41 as indicated by a dotted line 86. As will become apparent in the further course of this disclosure, the device 85 provides an electric signal upon attainment by the compensator mirror 40 of a predetermined state of angular advancement. This state of angular advancement is illustrated in FIG. 1 by the dotted line 40' and corresponds to the position to which the mirror 40 has to be advanced in order to completely display images during normal operation of the motion picture projector.

Figure 8:
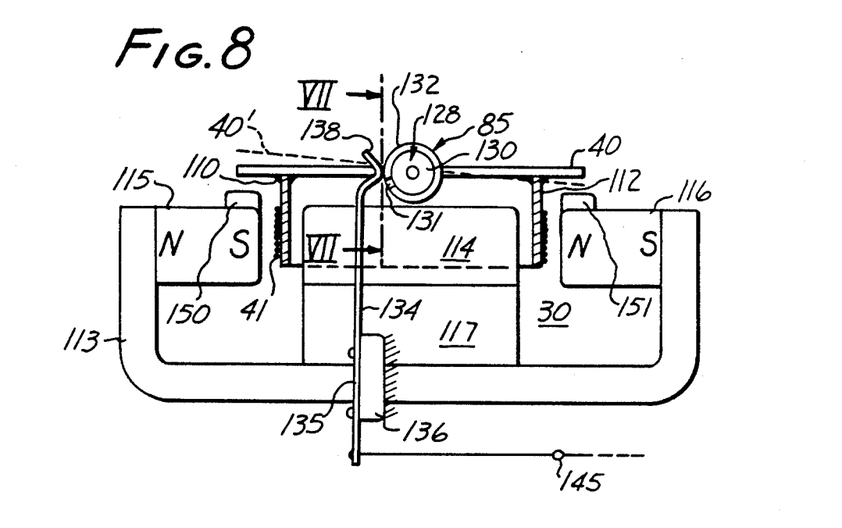
FIG. 8 is a side view, partially in section, of a compensator for use in the projector of FIG. 1.
Figure 9:
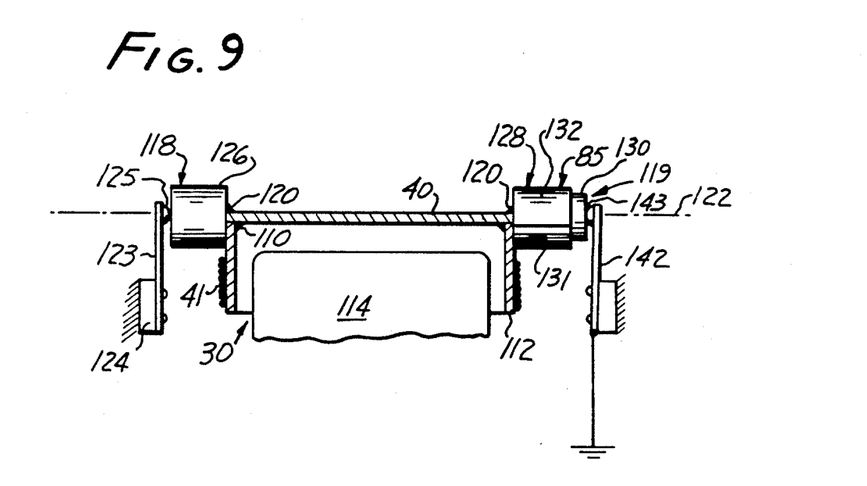
FIG. 9 is a section along line IX—IX in FIG. 8.

A preferred form of signal generating device 85 according to the above mentioned Woodier application and suitable for use in the projector of FIG. 1 is shown in FIGS. 8 and 9, which also illustrate a preferred optical compensator 30 including the compensator mirror 40.

The compensator mirror 40 is mounted by means of a cement 110 on a short tube 112 of non-magnetic material. The mirror drive coil 41 is wound on the tube 112. The tube 112 with drive coil 41 partially extends between pole pieces of a magnetic armature 113 which may be of a conventional permanent-magnet type, having a central core 114 of soft magnetic material and permanent-magnet pole pieces 115 and 116. The central core 114 is mounted on a post 117 of non-magnetic material. Suitable fasteners (not shown) retain the pole pieces 115 and 116, the central core 114 and the post 117 in position relative to the main body of the armature 113. Mechanical stops 150 and 151 may be provided to avoid contact of the coil 41 or tube 112 with the pole pieces 115 and 116 and the core 114. In contrast to prior-art stops, these stops are so positioned as to be not regularly contacted by the driven compensator part. Rather, these stops are placed beyond the regular range of motion of the driven compensator part.

Two bearings 118 and 119 are coupled to the mirror 40 and tube 112 by cement bonds 120 and mount the compensator mirror 40 for pivotal or angular movement about an axis 122. A mounting blade 123 is fixedly held at one end as shown at 124 and carries at the other end a pivot member 125 which frictionally engages the bearing member 126.

The signal generating device 85 is combined with the bearing 119 in the form of a rotary electric switch 128. The rotary switch 128 includes a core 130 of electrically conducting material. The core 130 has an integral radial projection 131 which forms an electrical switch contact. A sleeve 132 of electrically insulating material circumferentially covers the conducting core 130, except for the switch contact 131.

An electrical contact blade 134 has one of its ends 135 fixedly mounted as shown at 136. The other end 138 of the contact blade 135 is in engagement with the insulating sleeve 132 of the rotary switch 128.

The rotary switch 128 is coupled to and actuated by the compensator advancing coil 41. In the illustrated embodiment, the rotary switch 128 is also coupled to the compensator mirror 40 by a cement bond 120. In this manner, the moving portion of the rotary switch 128, including the elements 130, 131 and 132, follows the angular movement of the mirror 40. The angular position of the switch contact 131 relative to the reflecting surface of the mirror 40 is such that the movable switch contact 131 engages the contact tip of the blade 134 upon attainment of the angular position 40' by the compensator mirror 40. It may be said that the switch contact 131 is at the beginning of a compensating operation displaced from the contact tip of the blade 134 by an angle which corresponds to the angle by which the compensator mirror has to be displaced for a complete display of a projected image.

The conductive core 130 of the rotary switch 128 is grounded by way of an electrically conducting mirror mounting blade 142 and an electrically conducting pivot member 143 connected to the blade 142 and contacting the core 130, as shown in FIG. 9, or alternatively by a flexible lead (not shown) connecting the core 130 to ground.

A schematic showing of the rotary switch 128 and the compensator mirror 40 is provided in FIG. 6 to illustrate the signal generating device 85 in conjunction with the reset doublet generator 84. The contact blade 135 remains in engagement with the insulating sleeve 131 of the rotary switch 128 until the compensator mirror 40 has reached its advanced position 40'. In consequence, the input terminal 145 of the doublet generator 84 remains insulated from ground until the attainment of the advanced position 40' by the mirror 40.

Upon attainment of the advanced position 40' by the compensator mirror 40, the doublet generator input terminal 145 is grounded by way of the rotary switch contact 131 and contact blade 135 which then move into electrical contact with each other. An electric reset signal of the type shown at 90 in FIG. 3 is thereby provided by the device 85 and applied to the doublet generator 84.

The doublet current generator 84 has a differentiator circuit 91 which produces a spike 92 in response to the input signal 90. A second differentiation spike, that would arise upon separation of the rotary switch contact 131 from the blade 135, is shown in dotted outline, since it is suppressed by the diode 141 in the differentiator 91.

In considering the operation of the circuits of FIG. 6, it is also possible to view the spike 92 as the reset initiation signal. In this case it may be said that the electric power supply (not shown), which is connected between the +15 V terminal and ground in FIG. 6, provides an electric current. That current charges the capacitor 140 of the differentiator 91 by way of the diode 141. The rotary switch 128 selectively conducts that current by way of the switch contact 131 and contact blade 135 when the mirror position 40' has been attained. This discharges the capacitor 140 and produces a reset initiation signal in the form of the spike 92.

The spike 92 drives a monostable or one-shot multivibrator 94 of a conventional type to produce a pulse 95. The pulse 95 is applied to a differentiating network 99 to produce the two oppositely poled spikes 100 shown at the terminal 62.

The terminal 62 being connected to the amplifier input 56, the spike signal 100 is applied to the amplifier 55. The amplitudes of the spikes 100 are such as to drive the amplifier 55 into saturation. This is an important feature since it dispenses with the need of a circuit for disconnecting the image movement sensor 45 during mirror resetting operations. In other words, the oppositely poled spikes 100 not only provide for the requisite pulse doublets, but also effect an automatic suspension of the control operation of the image movement sensor 45 during mirror resetting operations.

An arrow 102 adjacent the spike signal 100 symbolically leads to the pulse doublet 80 as it appears at the output 69 of the amplifier 55, and as it is applied to the compensator coil 41 to initiate and timely terminate the requisite mirror flyback preparatory to a display of the next image. It is thus seen that the device 85 provides an electric signal 90 upon attainment by the compensator mirror 40 of the predetermined state of advancement 40', and that the doublet generator 84 and amplifier 55 thereupon reset the compensator 30 preparatory to the display of the next image. A potentiometer 96 permits the width of the pulse 95 to be adjusted. This, in turn, permits an adjustment of the net energy with which the compensator mirror 40 is reversed.

Upon completion of the mirror resetting, the servo system including the photosensor 45 and amplifier 55 commences to lock in on the sprocket hole image belonging to the next succeeding image 23. Because of its illustrated construction the amplifier 55 is capable of generating decelerating power which is applied to the drive coil 41 to overcome large overshoots of the mirror 40. In general, however, the subject servo system can be made to operate so well that the above mentioned direct-current level (see potentiometer 108 in FIG. 7) is capable of precluding undue overshoots without the assistance of decelerating currents.

Since the compensator drive 41 is not slaved to any routine cam advance or sawtooth function generator, the rate of film advance is conveniently varied by varying the speed of the film drive 15. Variable-speed film drives are well known in the motion picture projector art.

It should be noted that the mirror position 40' is not necessarily the most advanced angular position which the compensator mirror 40 will attain during image display. In practical systems, factors such as electrical delays in the doublet generator 84 and servo amplifier 55, as well as inertia of the mirror 40 and mirror drive 41, will tend to require the generation of the reset initiation signal 90 at an advanced mirror position 40' which somewhat lags the extreme mirror advance position which the compensator mirror is to attain for image display. Adjustments for optimal performance are easily effected in the illustrated preferred embodiment by making the contact spring 134 adjustable relative to the block 136 so that the instant of electrical contact between the members 131 and 138 can be varied.

Figure 10:
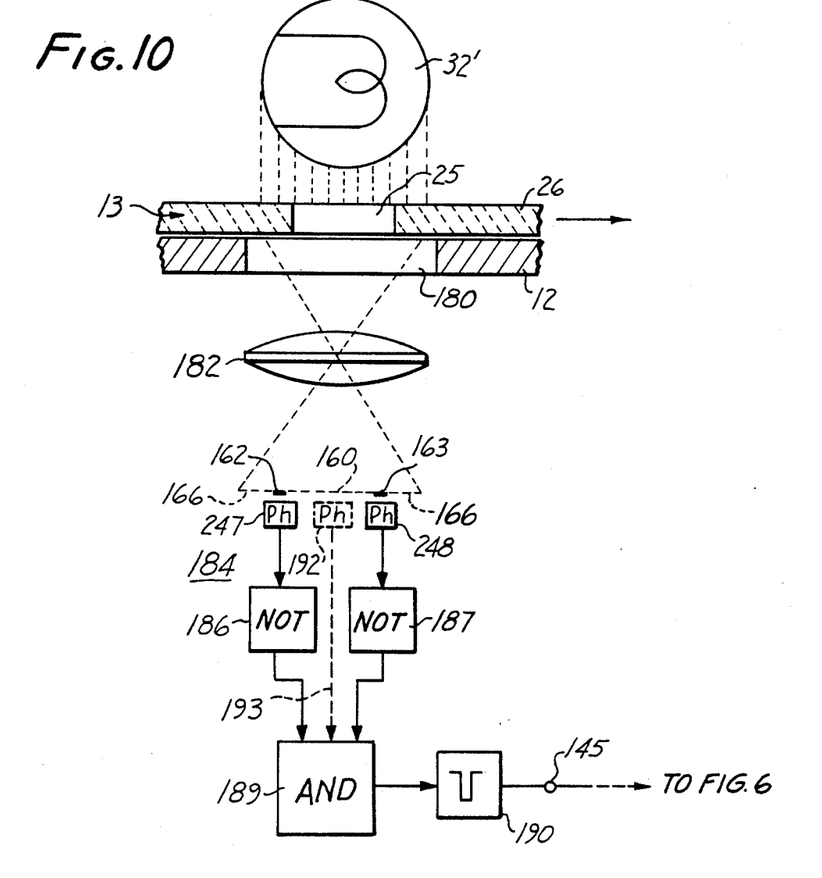
FIG. 10 is a side view, on an enlarged scale and partially in section, of an alternative sprocket hole sensor with accompanying logic circuitry for use in the projector of FIG. 1.

A further example of the versatility of the subject invention is illustrated in FIG. 10.

According to FIG. 10, the film gate 12 has a monitoring aperture 180 through which sprocket holes 25 are sensed in succession. In accordance with well known prior-art principles, the monitoring aperture may be so positioned that a sprocket hole 25 is in registration with the aperture 180 whenever an image has reached its final display position in the projection aperture.

The monitoring aperture 180 is illuminated by a light source 32' which may be identical with the projection lamp 32 or which may be a separate signal lamp. Since the film margin 26 is transparent, a conventional photosensor below the monitoring aperture would be illuminated all the time, making it difficult to produce sprocket-hole sensing signals.

In similarity to the previously described embodiment, a lens 182 projects an image 160 of the sprocket hole, as well as the above mentioned dark borderline element images 162 and 163 together with luminous areas 166 including light which has penetrated the transparent film margin 26. FIG. 10 shows these image elements in side view; top views thereof being apparent from FIGS. 3a to c.

The embodiment of FIG. 10 further includes a sensor 184 which includes the photocells 247 and 248 which may be of the type previously mentioned for the photocells 47 and 48. Unlike the photocells in the above mentioned sensor 45, the photocells in the sensor 184 are spaced by the same distance as the dark borderline element images 162 and 163. This means that both photocells in the sensor 184 will be obscured when the sprocket hole 25 has reached a given position in its travel along the film gate 12.

The sprocket hole sensor 184 of FIG. 10 further includes a pair of NOT elements 186 and 187 and an AND element 189. NOT elements or inverters as used in the sensor 184 are well-known logic circuit elements which have a high-level output during the presence of a low-level input; and a low-level output in the presence of a high-level input. The AND element 189 is a well-known logic circuit element that has a low-level output as long as either or both of its inputs receive a low-level input. To produce a high-level output, it is necessary that both inputs of the AND element receive a high-level input signal.

The photocell 247 is connected to the input of the NOT element 186, and the photocell 248 is connected to the input of the NOT element 187. This means that the AND element 189 will not be able to produce a high-level output as long as either or both of the photocells 247 and 248 are illuminated by light penetrating the transparent film margin 26 or the sprocket hole 25.

However, the input signals of the NOT elements 186 and 187 are switched to a low level when the dark borders are in coincidence with the photocells 247 and 248. This, in turn, energizes the inputs of the AND element 189 with high-level signals, resulting in a high-level AND element output signal. If desired, the output signal of the AND element 189 is applied to a conventional pulse shaper or monostable multivibrator 190 to produce a reset initiation signal which is applied to the input terminal 145 of the doublet generator 84 shown in FIG. 6.

The output signal of the AND element 189 ceases when the dark borderline element images 162 and 163 leave the photocells 247 and 248 in the course of the further travel of the film 13.

The sprocket hole sensor 184 may be easily adapted to operate with both transparent-margin film and opaque-margin film. To this end, the sensor is provided with a third photocell 192 between the photocells 247 and 248, and the AND element 189 is provided with a third input as shown in dotted outline at 193 in FIG. 10. As long as the opaque film margin covers the monitoring aperture 180, no high-level output signal can be produced by the AND element 189, since the photocell 192 is then obscured along with the photocells 247 and 248. However, the AND element 189 will produce a high-level output signal when areas of the opaque film margin adjacent the sprocket hole 25 obscure the flow of light to the photocells 247 and 248, since the photocell 192 is then illuminated by light flowing through the sprocket hole 25.

When transparent-margin film is used, the auxiliary photocell 192 is illuminated all the time and does thus not interfere with the operation of the photocells 247 and 248 and associated circuitry.

The embodiment of FIG. 10 may be used independently of or in conjunction with the sensor 45 of FIGS. 1 to 3c. In either case, the rotary switch 128 at the compensator mirror 40 may be replaced by the sprocket hole sensor of FIG. 10. The use of the rotary switch 128 is presently preferred over the embodiment of FIG. 10, since the rotary switch is immune to transparent or opaque markings or sprocket hole borders sometimes present in the film margin.

While the use of the subject invention in connection with image projection has been stressed herein, it should be understood that the invention may also be employed in electronic film scanners and the like. For instance, the image movement sensor of FIGS. 1 to 3c may be employed in lieu of the image movement sensor in the film video scanner disclosed in U.S. Pat. No. 3,067,284, by J.L.E. Baldwin, issued Dec. 4, 1962, and herewith incorporated by reference herein.

Similarly, the sprocket hole sensor of FIG. 10 may be employed to operate the flyback trigger circuit 49 of the scanner of FIG. 4 of the cited Baldwin patent.

It will now be appreciated that the subject invention provides several advanced solutions for a variety of needs and is not limited in its utility to any particular area of application.

We claim:
1. A method of sensing movement of a luminous sprocket hole image projected from a sprocket hole in a transparent film margin, comprising in combination the steps of:
projecting along with said sprocket hole image a borderline image located at said sprocket hole image and a luminous area including light having penetrated said transparent film margin adjacent said sprocket hole, said borderline image being darker than said luminous sprocket hole image and said luminous area; and
sensing movement of said borderline image with light-sensitive sensing means.
2. A method as claimed in claim 1, wherein:
said sprocket hole image, said borderline image and said luminous area are produced by transmitting light through said sprocket hole and adjacent transparent film margin, and projecting said transmitted light.
3. A method of sensing movement of a luminous sprocket hole image projected from a sprocket hole in a transparent film margin, comprising in combination the steps of:
projecting along with said sprocket hole image a first borderline element image located at one side of said sprocket hole image, a second borderline element image located at an opposite side of said sprocket hole image, and luminous areas located adjacent said borderline element images and including light having penetrated said transparent film margin adjacent said sprocket hole, said borderline element images being darker than said luminous sprocket hole image and said luminous areas; and
sensing movements of said first borderline element image with first light-sensitive sensing means; and
sensing movements of said second borderline element image with second light-sensitive sensing means.
4. A method as claimed in claim 3, wherein:
said sprocket hole image, said borderline element images and said luminous areas are produced by transmitting light through said sprocket hole and adjacent transparent film margin, and projecting said transmitted light.
5. A method as claimed in claim 3, wherein:
said first sensing means are employed to sense movement of said first borderline element image in a first direction; and
said second sensing means are employed to sense movement of said second borderline element image in a second direction opposed to said first direction.
6. A method as claimed in claim 3, wherein:
said first and second sensing means are spaced from each other by a distance substantially equal to a distance between said first and second borderline element images.
7. A method as claimed in claim 3, wherein:
said first and second sensing means are spaced from each other by an overall distance smaller than the distance between said first and second borderline element images.
8. A method as claimed in claim 3, wherein:
said first and second sensing means are spaced from each other by a distance larger than the distance between outsides of said first and second borderline element images.
9. In a method of tracking information areas on a substantially continuously moving film with a repeatedly advancing optical compensator for sequentially tracking said film areas to compensate for the continuous film movement, said film having in a transparent film margin a sprocket hole for each information area, the improvement comprising in combination the steps of:
projecting by way of said optical compensator a luminous image of said sprocket hole, a first borderline element image at one side of said sprocket hole image, a second borderline element image at an opposite side of said sprocket hole image, and luminous areas located adjacent said borderline element images and including light having penetrated said transparent film margin adjacent said sprocket hole, said borderline element images being darker than said luminous sprocket hole image and said luminous areas;
sensing movements of said first borderline element image in a first direction with first light-sensitive sensing means;

sensing movements of said second borderline element image in a second direction extending opposite to said first direction with second light-sensitive sensing means; and controlling the advance of said optical compensator in response to sensed movements of said first borderline element image in said first direction and sensed movements of said second borderline element image in said second direction.

10. A method as claimed in claim 9, wherein:

said sprocket hole image, said borderline element images and said luminous areas are produced by transmitting light through said sprocket hole and adjacent transparent film margin, and projecting said transmitted light by way of said optical compensator.

11. A method as claimed in claim 9, wherein:

said first and second sensing means are spaced from each other by a distance smaller than the distance between said first and second borderline element images.

12. A method as claimed in claim 9, wherein:

said first and second sensing means are spaced from each other by a distance larger than the distance between outsides of said first and second borderline element images.

13. A method as claimed in claim 9, including in combination with said steps the further steps of:

projecting a second luminous image of a sprocket hole in said transparent film margin, a third borderline element image at one side of said second sprocket hole image, a fourth borderline element image at an opposite side of said second sprocket hole image, and further luminous areas located adjacent said third and fourth borderline element images and including light having penetrated said transparent film margin, said third and fourth borderline element images being darker than said second luminous sprocket hole image and said further luminous areas;

sensing relative movement of said third and fourth borderline element images; and resetting said optical compensator between tracking operations in response to said sensed movement of said third and fourth borderline element images.

14. In a method of tracking information areas on a substantially continuously moving film with a repeatedly advancing optical compensator for sequentially tracking said film areas to compensate for the continuous film movement, said film having in a transparent film margin a sprocket hole for each information area, an improvement for resetting said optical compensator between tracking operations, comprising in combination the steps of:

transmitting light through said sprocket hole and adjacent transparent film margin to produce a luminous image of said sprocket hole, a borderline image adjacent said sprocket hole image, and a luminous area including light transmitted through said adjacent transparent film margin, said borderline image being darker than said luminous sprocket hole image and said luminous area;

sensing relative movement of said borderline image; and resetting said optical compensator between tracking operations in response to said sensed borderline image movement.

15. A method as claimed in claim 14, wherein:

said borderline image is produced to include a first borderline element image at one side of said sprocket hole image and a second borderline element image at an opposite side of said sprocket hole image, said first and second borderline element images being spaced from each other in a direction of movement of said film, and being darker than said luminous sprocket hole image and said luminous area;

relative movement of said borderline image is sensed by sensing relative movement of said first and second borderline element images; and said optical compensator is reset between tracking operations in response to said sensed movement of said first and second borderline element images.

* * * * *